United States Patent
Subbian

(10) Patent No.: US 10,348,820 B2
(45) Date of Patent: Jul. 9, 2019

(54) PEER-TO-PEER CONTENT DISTRIBUTION

(71) Applicant: Facebook, Inc., Menlo Park, CA (US)

(72) Inventor: Karthik Subbian, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 132 days.

(21) Appl. No.: 15/411,190

(22) Filed: Jan. 20, 2017

(65) Prior Publication Data

US 2018/0213033 A1    Jul. 26, 2018

(51) Int. Cl.
| | | |
|---|---|---|
| *G06F 15/16* | (2006.01) | |
| *G06F 15/173* | (2006.01) | |
| *H04L 29/08* | (2006.01) | |
| *G06Q 50/00* | (2012.01) | |
| *H04W 4/80* | (2018.01) | |
| *H04W 4/21* | (2018.01) | |

(52) U.S. Cl.
CPC ......... *H04L 67/1091* (2013.01); *G06Q 50/01* (2013.01); *H04L 67/104* (2013.01); *H04L 67/26* (2013.01); *H04L 67/306* (2013.01); *H04L 67/327* (2013.01); *H04W 4/21* (2018.02); *H04W 4/80* (2018.02)

(58) Field of Classification Search
CPC .......................... H04L 67/1091; H04L 67/306
USPC ........................................................ 709/207
See application file for complete search history.

(56) References Cited

U.S. PATENT DOCUMENTS

| | | | |
|---|---|---|---|
| 8,327,012 B1* | 12/2012 | Nguyen | H04N 21/23103 709/231 |
| 9,705,998 B2* | 7/2017 | Krishnaswamy | G06Q 30/02 |
| 2002/0090934 A1* | 7/2002 | Mitchelmore | H04L 29/06 455/412.2 |
| 2005/0286546 A1* | 12/2005 | Bassoli | G11B 27/002 370/432 |
| 2009/0172565 A1* | 7/2009 | Jackson | H04L 67/1095 715/753 |
| 2009/0210533 A1* | 8/2009 | Verhaegh | G06F 17/30209 709/226 |
| 2010/0217660 A1* | 8/2010 | Biswas | G06Q 30/02 705/14.38 |
| 2010/0280904 A1* | 11/2010 | Ahuja | G06Q 30/02 705/14.58 |
| 2012/0254246 A1* | 10/2012 | Kerger | H04W 4/21 707/780 |
| 2014/0214895 A1* | 7/2014 | Higgins | G06F 17/30867 707/770 |

(Continued)

*Primary Examiner* — Karen C Tang
(74) *Attorney, Agent, or Firm* — Baker Botts L.L.P.

(57) ABSTRACT

Certain embodiments described herein relate to peer-to-peer content distribution. In one embodiment, a method includes a first device receiving content and determining a content categorization of the received content. The first device may detect a second computing device and communicate with that it through a direct wireless connection (e.g., Bluetooth). Through the direct wireless connection, the first device may receive information associated with a user of the second computing device from the second device. Based on the information associated with the user and the content categorization of the content, the first device may determine a likelihood of the user being interested in the content. The first device may push the content to the second computing device through the direct wireless connection based on the likelihood of the user being interested in the content.

20 Claims, 7 Drawing Sheets

(56) References Cited

U.S. PATENT DOCUMENTS

| | | | |
|---|---|---|---|
| 2015/0066650 A1* | 3/2015 | Liu | G06Q 30/0251 705/14.64 |
| 2015/0254692 A1* | 9/2015 | Xu | G06Q 30/02 705/7.33 |
| 2016/0255082 A1* | 9/2016 | Rathod | H04L 63/10 726/1 |
| 2016/0330773 A1* | 11/2016 | Aneja | H04W 76/10 |
| 2017/0139925 A1* | 5/2017 | Shah | G06F 17/30029 |

* cited by examiner

PEER-TO-PEER CONTENT DISTRIBUTION

TECHNICAL FIELD

This disclosure generally relates to content distribution between peer client devices.

BACKGROUND

While ownership of mobile phones may be widespread even in emerging markets (e.g., India), data network access may nevertheless be limited due to poor coverage or high cost. For example, cellular data plans and residential Wi-Fi or cable Internet access may be unaffordable for many, and free public Wi-Fi or hotspots may also be limited. For those lacking data network access, content (e.g., news, articles, social-network postings, etc.) may not be readily obtainable.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user (e.g., information about the user, including the user's interests) and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for short-range wireless communication, such as BLUETOOTH communication, near-field communication (NFC), or infrared (IR) communication or communication with a wireless local area networks (WLANs). A device may also be capable of communicating with a cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The subject matter described herein relates to peer-to-peer content sharing through short-range wireless transmissions so that a community with limited data access may nevertheless obtain content. Conceptually, every mobile device may be both a content hub (e.g., when the device is transmitting content to another device) and a content consumer (e.g., when the device is receiving content from another device). Once a device obtains content, it may function as a content hub and redistribute the obtained content to content consumers who may be interested in the content but have limited access to a data network (e.g., cellular network connected to the Internet) to download the content themselves. The content hub may transmit content to nearby content consumers via short-range wireless communication technologies, such as Bluetooth, Bonjour, Wi-Fi direct, etc. After receiving the content, those content consumers may then become content hubs and further redistribute the content to other devices lacking data-network access.

The embodiments described herein for distributing content is different from conventional file-sharing networks, where users all have access to the file-sharing network through the Internet. Conventional file-sharing networks require content to be manually selected for downloading by interested users, which means users wishing to obtain content have to be actively engaged in the task of content section and retrieval. Further, because content on each user device is made available for browsing and selection, conventional file-sharing networks also expose members to security/privacy risks. Unlike such conventional file-sharing networks, particular embodiments described herein distribute content through a pushing mechanism, where the content hub or server determines to whom content should be transmitted. As such, security and privacy concerns may be minimized, and device downtime (e.g., when a device is not being actively used by its user) may be leveraged to obtain content and ready the content for viewing.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In communities or regions where access to data networks (e.g., the Internet) may be limited, embodiments described herein may be used to distribute content through devices within the community/region via short-range wireless communication. In particular embodiments, each device may act as a carrier and distributor of content. For example, content may be stored on a device for a period of time, during which the content may be distributed by the device to other nearby devices through short-range wireless communication. Those other device may thereafter become carriers and distributors of the content. In this manner, content may be distributed throughout a region despite it having limited data access.

Figure 1:
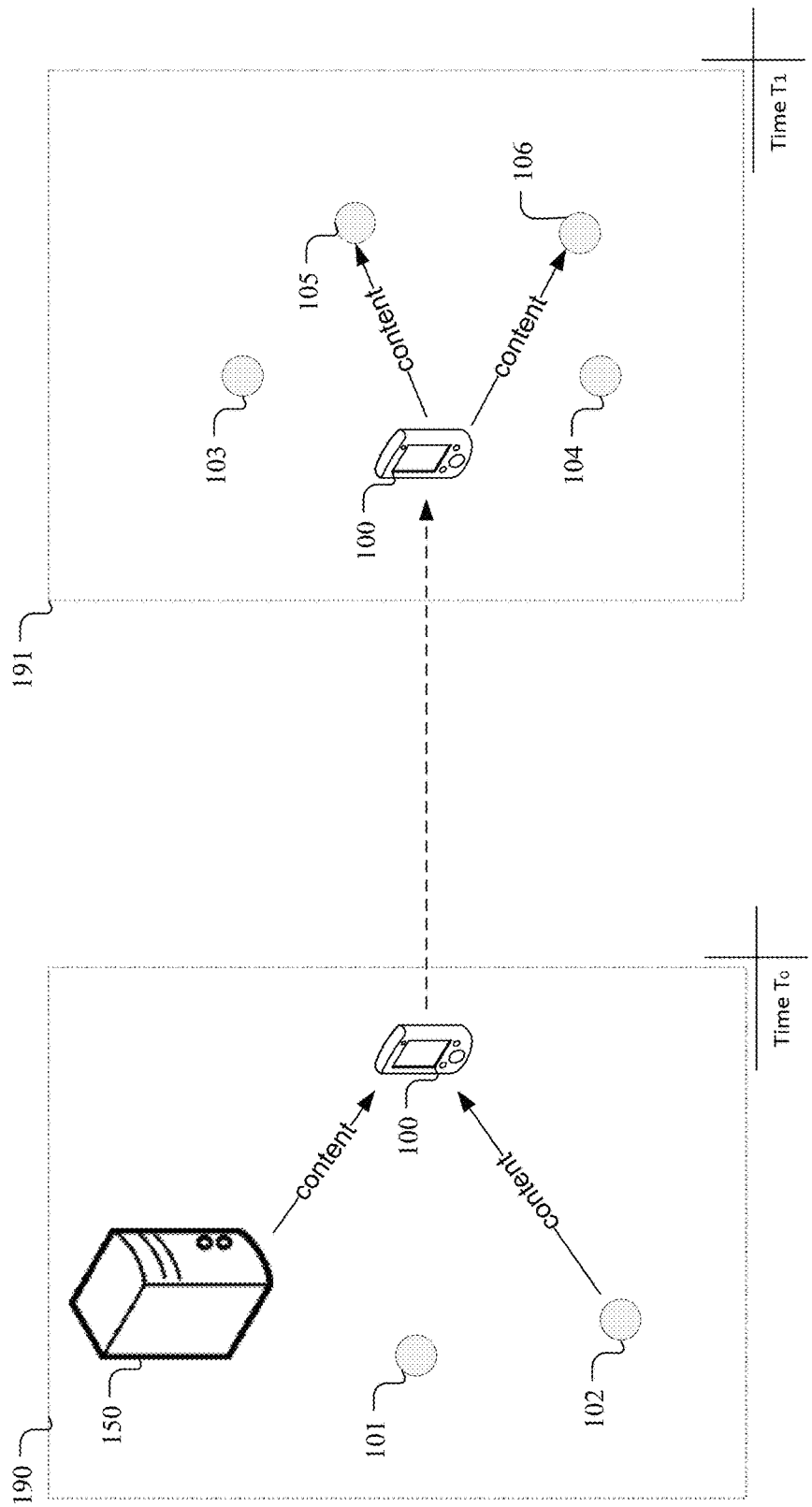
FIG. 1 illustrates an example of peer-to-peer content distribution in accordance with particular embodiments described herein.

FIG. 1 illustrates an example of peer-to-peer content distribution in accordance with particular embodiments described herein. Each device 100-106 may conceptually be considered a content hub (the transmitter) or content consumer (the recipient) depending on its role in a content transmission exchange. For example, device 100 may be considered a content consumer when receiving content from device 102 at time $T_0$, and a content hub when distributing content to devices 105 and/or 106 at time $T_1$. In particular embodiments, content may be obtained by a device 100 from a server 150 (e.g., via a Wi-Fi or cellular connection) and/or another nearby device 102 via short-range wireless communication. Referring to the content transmission 190 taking place at time $T_0$, for example, the user of device 100 may, e.g., be at work where there is Wi-Fi connection through which the device 100 may connect to server 150. In particular embodiments, the received content may be stored locally at least temporarily on device 100. For example, the content may be stored for a predetermined amount of time (e.g., ten minutes, an hour, a day, two days, etc.), until it is consumed by the device's user (e.g., until the user views it), until it is distributed to an intended target (e.g., a target recipient device or cluster), or any other suitable terminating criteria. In particular embodiments, while the content is stored on device 100, the device 100 may act as a content hub and distribute the content to nearby content consumers, which may in turn become content hubs and redistribute the content to their neighboring devices. For example, the illustrated device 100 may be a redistributor of content from device 102 (e.g., device 100 may redistribute the content to devices 101, 105, 106, etc.). In particular embodiments, a content hub 100 carrying content may, over time, physically relocate to another location (e.g., going home after work), or its neighboring content consumers may change (e.g., different shoppers at a shopping mall). For example, referring to the illustrated transmission interaction 190 taking place at time $T_0$, the content hub 100 may obtain content from one or both the server 150 and device 102 at work. Referring now to the illustrated transmission interaction 191 taking place at time T1, the user of content hub 100 may have, e.g., returned home after work. At home, content hub 100 may be surrounded by devices 103-106 of his friends or family. Even if those devices 103-106 may not have access to the Internet at the user's home (e.g., via Wi-Fi, DSL, or cellular network), they 103-106 may nevertheless obtain content from content hub 100 through short-range wireless communication. In the example shown, content hub 100 may have decided to redistributed the content to devices 105 and 106, but not to devices 103 and 104. By enabling content hubs to physically carry content to regions with limited data access, content may be distributed to content consumers (e.g., devices 105 and 106) that were not within wireless transmission range of the content hub (e.g., device 100) at the time the content hub initially received the content.

In particular embodiments, users wishing to receive content offline through the peer-to-peer network described herein may opt-in to the service. For example, users may install on their devices client-side software/application that manages content sharing as described herein, and through the installed software the client may opt-in to be part of the distribution network. In particular embodiments, the content distribution network may consist of user devices that have opted-in to be part of the network. In particular embodiments, when a user device acting as a content hub seeks to distribute content, the content hub may first determine whether a nearby device is within wireless transmission range and has opted-in to the network. If so, the content hub may automatically push the content to that device. The content consumer may then store the received content locally for viewing by its user and redistribution.

Privacy issues may be a concern when it comes to content sharing between devices. In particular embodiments, content stored on a user's device may have privacy settings that designate the content as, e.g., public or private. In particular embodiments, certain types of content stored on the device may implicitly be treated as public or private based on, e.g., their storage locations (e.g., content in storage locations associated with the device's camera, email, calendar, notes, or other personal applications or content-generating application may be treated as private and those stored by a news application or other viewers may be treated as public), file type (e.g., *.html files may be deemed public and *.jpg files may be deemed private), privacy labels, and any other indicia of whether the content is of a public or private nature. With respect to social-media content, in particular embodiments only content available through a user's public timeline/newsfeed (e.g., a news article) or content without privacy filters may be subject to redistribution.

In particular embodiments, each content hub may locally determine whether to push content to particular neighboring content consumers. For example, content hub 100 in FIG. 1 may have determined to distribute its content to devices 105 and 106 but not to devices 103 and 104. In particular embodiments, a determination of whether to push content to a device may take into consideration the nature of the content and the interest of the potential recipients. For example, a function $f(c,j)$ may represent an algorithm used by a content hub 100 to compute a likelihood of a consumer j (e.g., any of the devices 103-106) being interested in a content c. In particular embodiments, while the content hub 100 is in possession of the content (e.g., stored locally), the hub 100 may classify the content based on subject matter (e.g., news, sports, etc.), type, timestamp, and/or other content characteristics. For example, a content hub 100 may classify an article by subject matter based on classifiers trained using machine learning. As another example, a received content may be pre-classified by the source of the content (e.g., content from a social-media network server 150 may be pre-classified as being related to a particular subject matter). In particular embodiments, a consumer j (e.g., any of the devices 103-106) within direct wireless communication range (e.g., Bluetooth) with the content hub 100 may transmit an interest profile to the content hub 100. An interest profile, for example, may be any information pertaining to a likely interest of the user, whether directly (e.g., the user is interested in sports, politics, etc.) or indirectly (the user is a young parent, which may mean he/she is likely interested in toddler clothes or toys). The interest profile may be determined by consumer j through any suitable means. For example, the interest profile may be specified by a user via software installed on device j that governs the offline-content-distribution functionality. As another example, the interest profile may be downloaded from a social-networking server. As yet another example, the interest profile may be generated on device j based on information available on the device (e.g., user's gender, age, browsing history, etc.). In particular embodiments, the function $f(c,j)$ may use the content classification and the consumer's interest profile to determine a likelihood of the associated user being interested in the content (e.g., checking whether the subject matter tags of the content match the interests of the user). In particular embodiments, the algorithm for determining a likely interest level may be based on a prediction model trained using machine learning. For example, a server associated with the offline content distribution system may use supervised machine learning to train a computer model and download it to the content hub 100. The content hub 100, which in particular embodiments may have determined the interest profile of consumer j and the classification of content c, may use the computer model to analyze various features of the interest profile (e.g., subject-matter interests, age, gender, etc.) and determine a likelihood of a user with such an interest profile being interested in the subject matter of content c. In particular embodiments, $f(c,j)$ may output a percentage or confidence score representing a likelihood of a user being interested in the subject matter of content c. For example, $f(c,j)$ may indicate that there is a 73% chance that a male teenager interested in action movies may be interested in an article related to first-person-shooter video games. In particular embodiments, the content hub 100 may decide whether to transmit content c to device j based on the interest likelihood as determined by $f(c,j)$. For example, content hub 100 may decide to distribute content c to device j if the likely level of interest as determined by $f(c,j)$ is above a certain threshold (e.g., if $f(c,j)>\delta$), and not distribute the content c if the threshold is not met (e.g., if $f(c,j) \leq \delta$).

Since any number of devices may be co-located within the same wireless transmission range, in particular embodiments there may be certain rules for governing how content should be distributed based on the interaction scenarios of the devices. For example, at a high-level there may be three types of interaction scenarios: 1-hub to n-consumers (1:n), n-hubs to 1-consumer (n:1), and n-hubs to m-consumers (n:m). Referring to FIG. 1, an example of 1:n interaction scenario may be represented by the situation shown in transmission 191, where content hub 100 may be determining whether to distribute content to potential content consumers 103-106. In this scenario, the content hub 100 may use $f(c,j)$ to determine whether to push content c to each of the four consumers 103-106. For example, each of the potential consumers 103-106 may send its interest profile to content hub 100 and content hub may use $f(c,j)$ to determine a likelihood of the associated user being interested in the content c. In particular embodiments, in situations where several users may be interested in the content (e.g., several $f(c,j)$ satisfying a threshold), only those with the k largest $f(c,j)$ value may be transmitted. For example, even if the interest likelihood of each of the potential consumers 103-106, which may be respectively denoted $f(c,103)$, $f(c,104)$, $f(c,105)$, and $f(c,106)$, satisfies the threshold requirement, a distribution rule may only allow two (e.g., k=2 or 50% of the candidates) of the potential consumers with the highest $f(c,j)$ values to obtain the content c (e.g., devices 105 and 106 may ultimately obtain the content c and not devices 103 and 104 because, e.g., $f(c,105)>f(c,106)>f(c,104)>f(c,103)$). Conceptually, this rule gives preference to potential consumers who are more likely to be interested in the content. Further, to avoid overly burdening any hub, in particular embodiments there may be a data limit constraining the amount of data a hub may transmit or a consumer may receive.

An example of an n:1 (i.e., n-hubs to 1-consumer) interaction scenario is shown by transmission 190, where multiple devices (e.g., 101 and 102) may be determining whether to distribute content to device 100. In particular embodiments where the $f(c,j)$ function does not depend on information relating to the content hub itself, the $f(c,j)$ results of all the hubs (e.g. devices 101 and 102) may be compared equally (e.g., ranked) to determine which ones of the hubs should transmit their content to the consumer 100. In particular embodiments, the consumer 100 may transmit its interest profile to each of the content hubs 101 and 102, which may then determine their respective interest-likelihood values, $f(c_{101},100)$ and $f(c_{102},100)$, where $c_{101}$ represents the content stored on device 101 and $c_{102}$ represents the content stored on device 102. In particular embodiments, the interest-likelihood values from each of the n-hubs may be transmitted to and ranked by the consumer. For example, content hubs 101 and 102 may transmit, respectively, $f(c_{101},100)$ and $f(c_{102},100)$ to content consumer 100. The content consumer 100 may then determine which content to obtain based on the information provided. For example, the content consumer 100 may rank the contents based on the interest-likelihood values. For instance, content consumer 100 may determine that its user is more likely to be interested in the content of device 102 (e.g., because $f(c_{102},100)>f(c_{101},100)$). In particular embodiments, ranking may also take into consideration the physical distance and/or signal strength between the hubs and the consumer. Based on the ranking, the consumer may in particular embodiments transmit an indication of acceptance of the content offered by any of the content hubs and obtain, e.g., the top k highest ranked content from those content hubs.

An example of an n:m (i.e., n-hubs to m-consumers) interaction scenario may be represented by the situation shown in transmission 191, where it may be assumed that both devices 100 and 103 may be content hubs and devices 104, 105, and 106 may be content consumers. In particular embodiments, the n:m interaction scenario may be simplified as an n:1 scenario (described above) for each of the m-consumers. For example, a first n:1 scenario may involve hubs 100 and 103 and consumer 104; a second n:1 scenario may involve hubs 100 and 103 and consumer 105, and a third n:1 scenario may involve hubs 100 and 103 and consumer 106.

In particular embodiments, the connection between devices may be unstable because connection may be based on short-range wireless communication and mobile devices may move in and out of transmission range. To increase the likelihood of successful transmission, a content hub in particular embodiments may determine the minimum required time for transmitting a content to a neighboring consumer (e.g., based on content size, physical distance from the consumer, and other factors influencing transmission time) and assess whether the connection between the two is sufficiently stable before transmission (e.g., based on relative movement information between a hub and a consumer, historic movement information, frequency of connection breakage, average duration of maintained connection, and other factors relevant to connection stability).

Figure 2:
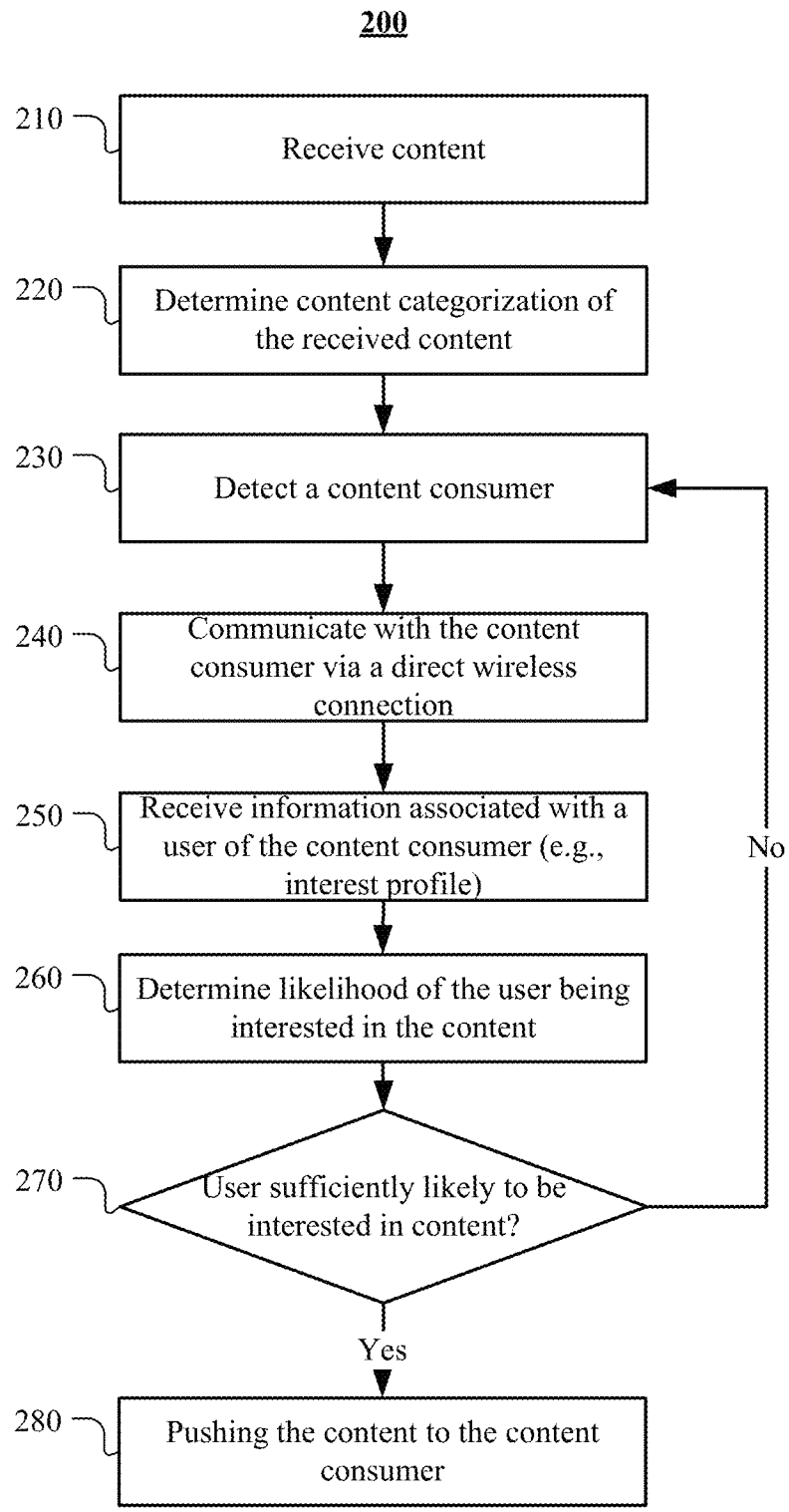
FIG. 2 illustrates an example method for distributing content to peer user devices.

FIG. 2 illustrates an example method 200 for distributing content to peer user devices. In particular embodiments, the method may begin at step 210, where a first computing device may receive content. For example, the content may be received from, e.g., another computing device via short-range wireless connection or a server via a data network (e.g., cellular network connected to the Internet). In particular embodiments, whether the content may be redistributed may depend on whether the content is publically available. For example, the content may be redistributed if it is a public news article posted on a social-media network, but the content may not be redistributed if it has a privacy filter or is a message/photo received from a friend's device. At step 220, the first computing device may determine a content categorization of the received content. For example, the device may identify subject matter tags or metadata that were received with the content, analyze words appearing in the content to predict its subject matter (e.g., based on classification models trained using machine learning), etc. At step 230, the first computing device may detect a second computing device, such as a potential content consumer. At step 240, the first computing device may communicate with the second computing device through a direct wireless connection (e.g., Bluetooth, Wi-Fi direct, or any other suitable short-range wireless transmission technology), which may be different from the connection used for receiving the content. At step 250, the first computing device may receive, from the second computing device and through the direct wireless connection, information associated with a user of the second computing device. For example, the user's interest profile or other information that may be used to predict the user's interests (e.g. gender, age, education, residence, and other personal information) may be received. At step 260, the first computing device may determine a likelihood of the user being interested in the content based on the information associated with the user and the content categorization of the content. For example, the first computing device may use $f(c,j)$ as described above to determine a likelihood of the user being interested in the content. At step 270, based on the determined likelihood of the user being interested in the content, the first computing device may, at step 280, push the content to the second computing device through the direct wireless connection. For example, the determined interest likelihood may be compared against a threshold value and/or compared to other interest likelihood values of other potential content consumers to determine whether to push the content to the second computing devices. If the determined interest likelihood does not satisfy the predetermined criteria for pushing the content to the second computing device, the first computing device may continue to look for other potential content consumers for the content. In particular embodiments, pushing the content to multiple content consumers may occur substantially simultaneously (e.g., the content may be broadcast to multiple devices or transmitted serially less than 50 milliseconds, 100 milliseconds, 1 second, or 2 seconds apart of each other). Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for distributing content to peer user devices, including the particular steps of the method of FIG. 2, this disclosure contemplates any suitable method for distributing content to peer user devices including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
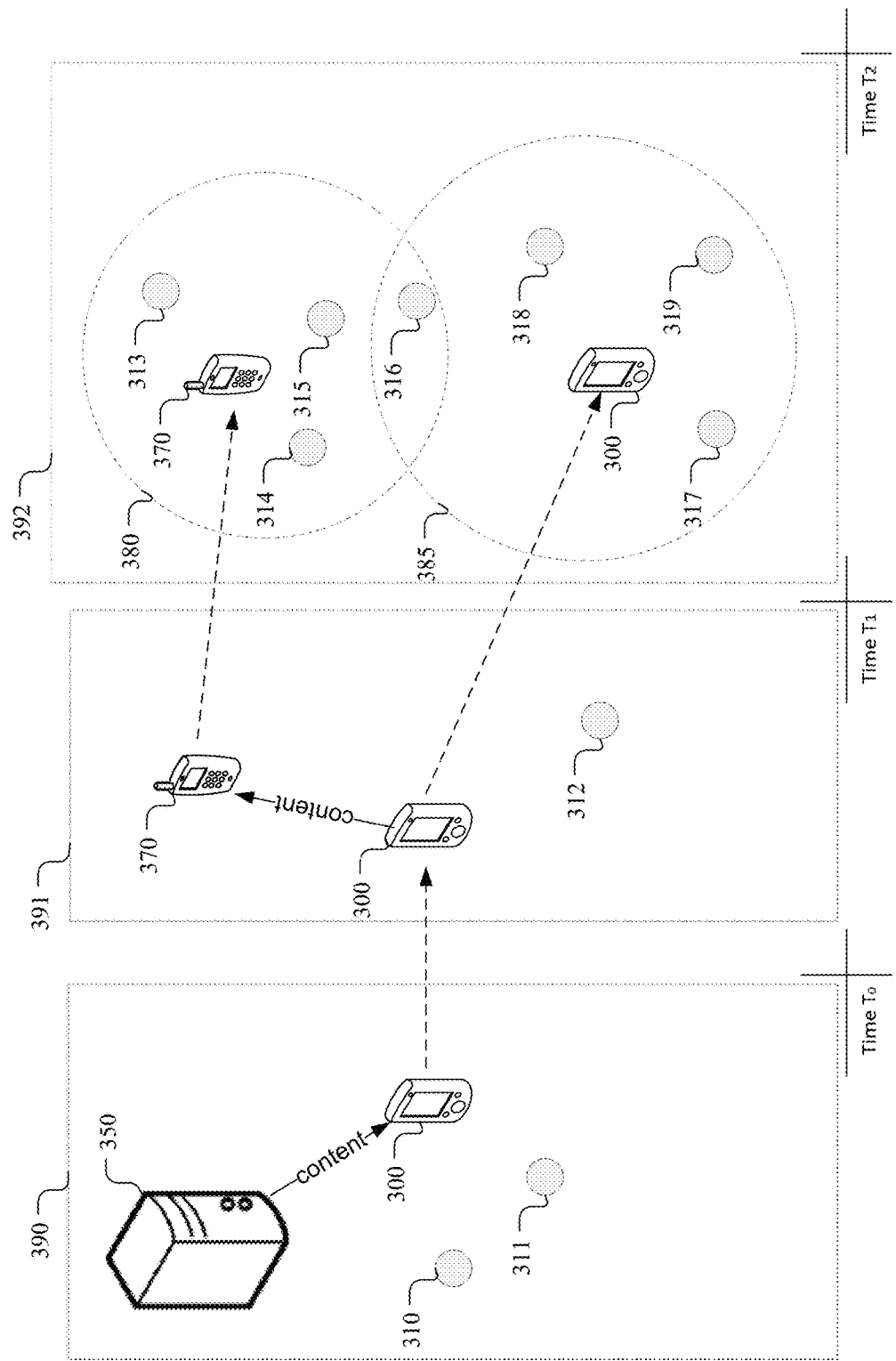
FIG. 3 illustrates an example of peer-to-peer distribution of content to clusters of user devices in accordance with particular embodiments described herein.

When a whole region, city, or neighborhood has limited data access, contents of interest may nevertheless be brought to consumers in those regions by, e.g., routing through several content hubs and having them physically bring the contents to the offline regions. For example, FIG. 3 illustrates an example of peer-to-peer distribution of content to clusters of user devices in accordance with particular embodiments described herein. In one example, FIG. 3 may depict a scenario where content may be injected at time $T_0$ from a server 350 to a content hub 300 during transaction 390 (e.g., when the user of content hub 300 may be connected to the server 350 at an Internet café). Continuing the example, when the user of hub 300 arrives at work at time $T_1$, it may share the content with a coworker's device 370 through short-range wireless transmission (transmission 391). Thereafter at time $T_2$, both content hubs 300 and 370 may physically bring the content back home for redistribution to their families and neighbors (transmission 392). The families and neighbors of each content hub may be examples of members of a cluster to which each content hub belongs. Conceptually, a cluster of devices may be logically associated to represent a group that is likely to interact (e.g., via short-range wireless communication) with each other at a particular region and/or time. For example, content hub 370 and devices 313-316 may belong to a cluster 380 and content hub 300 and devices 316-319 may belong to cluster 385, because, e.g., typically they are physically clustered together at or around time $T_2$. Some of these devices in the clusters may not be within direct wireless communication range with the content hub 300 at, e.g., time $T_0$ or time $T_1$. In particular embodiments, a server may conceptually group clusters of devices to guide content routing, since an objective of routing may be to bring content to as many interested devices as possible.

In particular embodiments, clusters of devices may be determined based on geographic location, time frames, and/or the users' interests. For example, a server may be aware of the general location of devices throughout the day (e.g., each device may send the server its location coordinates periodically or when it has network access). Based on the location data, the server may cluster the network of users based on geographic locations and/or time periods. For example, a particular device may belong to a first cluster during working hours (e.g., 8 am-6 pm) and a second cluster during non-working hours (e.g., 7 pm-7 am on weekdays and/or anytime on weekends). In particular embodiments, the server may further cluster devices based on, e.g., interests. For example, several clusters in a particular region and time frame may be defined to represent different general-interest groups. For example, at a user's home town, the server may define a cluster representing those interested in sports and another cluster representing those interested in theater. A user who is interested in basketball and ballet may be placed in both clusters (e.g., cluster 380 and 385 may each represent an interest-based cluster and device 316 may belong to both). In particular embodiments, the central server may further determine an interest profile for each cluster based on the interest profiles of users within that cluster. In particular embodiments, each user's interest profile may specify the user's level of interest in p interest categories. For example, if the p interest categories are sports, theater, and politics, a user who is very interested in sports (e.g., 9, on a scale of 10), mildly interested in theater (e.g., 5, on a scale of 10), and not interested in politics (e.g., 1, on a scale of 10) may have an interest profile of [9, 5, 1]. As another example, a second user in the cluster may have an interest profile of [7, 1, 3]. In particular embodiments, the interest profile of a cluster may be based on an average of the interest profiles of the cluster's users. Continuing the example above, an average of the first user's interest profile (e.g., [9, 5, 1]) and the second user's interest profile (e.g., [7, 1, 3]) may be [8, 3, 2], which may represent the interest profile of the cluster if the cluster only consists of those two users. Since the interest dimensions may be large in particular embodiments (e.g., p may be 200+), the central server may use autoencoders in order to reduce dimensionality and thereby simplify interest comparisons. The learned coefficients/weights of the autoencoders may be transmitted to user devices so that when they are acting as content hubs they may use the coefficients/weights to transform interest profiles into a lower dimension.

In particular embodiments, a content hub considering whether to push particular content to a particular content consumer may base its decision on the interest profiles of potentially affected clusters. For example, when a content hub considers whether to push content c to a neighboring consumer j, the hub may base its determination on whether the consumer j belongs to a cluster k that may likely be interested in the content. Referring to FIG. 3, for example, during transmission 391 at time $T_1$, content hub 300 may decide to distribute content to device 370 and not device 312 because device 370 belongs to a cluster 380 that is likely to be interested in the content. As another example, a content hub may consider both the likely interest level of the consumer j as well as the likely interest level of the cluster k with which the consumer j may come in contact (e.g., the consumer j may belong to the cluster k at home). The rationale is that since consumer j belongs to cluster k, consumer j would likely return to the geographic location of the cluster and thus be able to share the content with others in the region who are likely to be interested in the content according to the interest profile of the cluster k. In particular embodiments, a server may send each device the interest profile(s) of related cluster(s) (e.g., the clusters to which the device belongs), which may then be stored locally at each device. In particular embodiments, when two devices interact, the potential content consumer may transit the stored interest profile(s) of cluster(s) to the content hub. In particular embodiments, a hub may use a modified $f(c,j,k)$ function to assess the likelihood of consumer j being interested in the content c and the likelihood of the cluster k being interested in the content c. In particular embodiments, a single interest level may be output by $f(c,j,k)$ to represent a combined interest level of the device j and cluster k (e.g., the output may be a weighted average of the individual interest levels). In other embodiments, $f(c,j,k)$ may output two interest levels, one for device j and one for cluster k. The determination of whether to distribute the content c to device j may dependent on, e.g., whether the interest level(s) output by $f(c,j,k)$ satisfy certain criteria. For example, a content hub may decide to push the content if one or both of the interest levels of the device j and cluster k satisfy particular threshold(s).

In particular embodiments, a server may assess whether a target cluster may be interested in particular content (e.g., by comparing the content's subject-matter classification to the interest profile of the cluster) and cause the content to be routed to that cluster. In particular embodiments, a server may determine a possible routing strategy and instruct hubs to carry out the routing. In particular embodiments, the server may use the interest profile of the target cluster to identify potential hubs through which content may be injected into the distribution network and routed to the target cluster. A potential hub, for example, may be one that is connected to the server (e.g., through cellular network) when the server is making the routing determination. Selection of content hubs may be based on, e.g., the potential content hubs' likely interest in the content and the likelihood of them routing the content to the target cluster. For example, the server may compare potential content hubs' interest profiles to that of the target cluster or to the content to determine hubs that many themselves be interested in the content (which may be preferable to hubs that have no interest in the content). In another example where the hubs' own interests are given little weight, the hub-selection process may be primarily or exclusively based on the likelihood of the hubs successfully routing the content to the target cluster. The likelihood of the hubs routing the content to the target cluster may be based on, e.g., whether the hubs are physically located sufficiently close to the target cluster (e.g., physical distance between a content hub and the center of a cluster) and/or whether the hubs belong to the cluster or are otherwise likely to come into contact with members of the target cluster (e.g., the user of a content hub may be coworkers with someone who lives in a region that coincides with the target cluster). In particular embodiments, social-network connections may be also be used to determine the likelihood of two hubs interacting (e.g., family and first-degree friends may be more likely to interact). As an example, the server 350 may have decided to inject content through device 300 instead of devices 310 and 311 because, e.g., device 310's cluster may not be interested in the content and device 311 may be unlikely to interact with a device that belongs to a target cluster (e.g., device 370 of cluster 380).

In particular embodiments, the server may assume a static network environment for routing purposes if devices in the relevant network region are fairly stationary. For example, devices in a region may transmit their location information to the server through limited network access. Based on the received location information, the server in particular embodiments may conceptually take a snapshot of the network configuration and perform routing operations based on the network snapshot. For example, the server may compute commute-time distance between all users and find the shortest path between a target cluster and a candidate source hub at which to inject content. In particular embodiments, the server may then push the content to the selected source hub and provide it routing instructions. The source hub may then retransmit the content along with the routing instructions to other selected content hubs within the determined routing path so that each of the content hubs may progressively distribute the content according to the instructions until the intended destination is reached.

In particular embodiments where changes in the peer-to-peer network configuration is more dynamic (e.g., devices in the network relocate frequently), the server may take periodic snapshots (e.g., every 5 minutes, 15 minutes, 60 minutes, etc.) of the network to determine and adjust routing strategies. For example, to route a particular content to a target cluster, the server may at time $T_0$ take a snapshot of the network and determine a routing strategy. The content and routing instructions may be transmitted to a source content hub, which may then redistribute the content and instructions to other content hubs according to the routing instructions. In particular embodiments, the routing instructions may include an expiration time for the routing instructions. For example, if after 15 minutes the content is not routed to the target destination, the content hub with the content may request updated routing instructions from the server. Further, in particular embodiments a content hub may request updated routing instructions from the server when it cannot continue routing according to the routing instructions (e.g., a content hub in the routing path cannot be found). The server may use another snapshot taken at time $T_1$ of the network and make adjustments to, e.g., the commute-time distance between devices, the pool of candidate content hubs (e.g., hubs may move farther away or closer to the target cluster), and/or the routing strategy. In particular embodiments, the server may consider the likelihood of a content hub physically relocating to or towards the target cluster. For example, the server may consider a hub's movement patterns (e.g., going to work in a first region during the day and returning home in a second region at night), current movement trajectory (e.g., moving north-bound), and/or the cluster to which the hub belongs in order to predict whether the hub is likely to move closer to the target cluster. Updated routing instructions may be provided to the hub carrying the content so that it may continue routing the content based on the updated instructions until the destination is reached.

In particular embodiments, the routing instructions provided to a content hub may include additional information aside from the determined routing path to enable the content hub to make routing decisions itself. For example, the server may provide a content hub directional information that indicates the general direction of an intended destination target device or cluster (e.g., the cluster may be associated with a geographic location, which may be represented by the center of the cluster). For example, the directional information may be transmitted with the content to each content hub carrying the content to the target cluster. Based on the directional information, each content hub may, e.g., use a greedy routing algorithm to route the content towards the direction of the destination. As another example, the server may provide a content hub information relating to movement patterns or predicted movements of nearby content consumers (e.g., the consumer's trajectory and historic movement patterns). In particular embodiments, each content consumer may track such information itself and shared it with the content hub. The content hub may therefore base its routing decision on the movement information of the content consumers to determine which consumer would likely serve as a better content hub for distributing the content towards the target cluster (e.g., content consumers who are moving towards the target cluster may be weighted more favorably).

Figure 4:
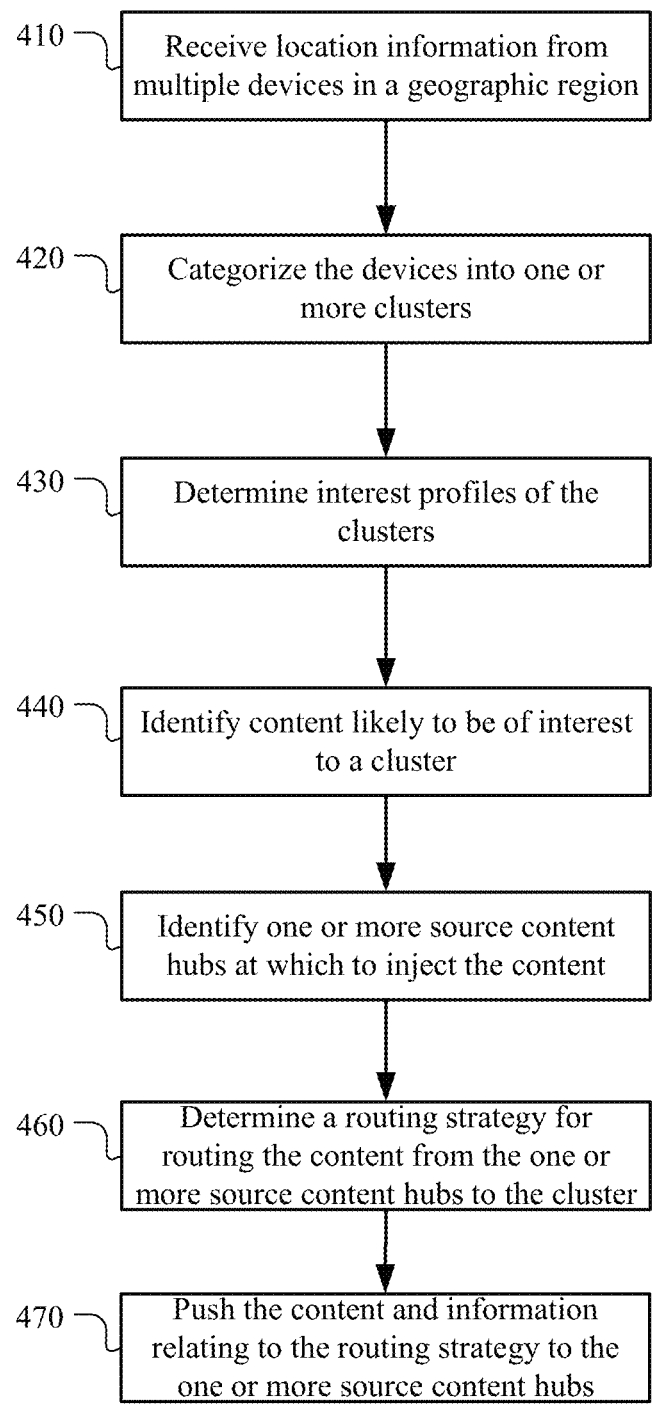
FIG. 4 illustrates an example method for distributing content to clusters of user devices.

FIG. 4 illustrates an example method 400 for illustrates an example method for distributing content to clusters of user devices. The method may begin at step 410, where a server may receive geographic location information from multiple devices within a region. For example, those devices may transmit their GPS-based location to the server at moments when they are connected to the Internet. At step 420, the server may categorize the devices into one or more clusters. For example, the clustering may be based on geographic location proximity and/or time period (e.g., clusters associated with after-working hours may differ from clusters associated with working hours), as well as user interests (e.g., a region may have more than one clusters representing different interest categories, such as sports and politics). At step 430, the server may determine interest profiles of the clusters. For example, as discussed above, a cluster's interest profile may be based on the interest profiles of individual devices within the cluster. At step 440, the server may identify content likely to be of interest to a cluster based on, e.g., that cluster's interest profile. For example, an article about basketball may be of interest to a cluster of users interested in sports. At step 450, the server may identify one or more source content hubs in the region at which the content may be injected into the regional peer-to-peer network. For example, the server may identify potential hubs that are currently connected to the Internet and sufficiently close to the target cluster. As another example, the server may further select source content hubs from the potential hubs that, e.g., share similar interest with the target cluster, belong to the target cluster, and/or is likely to interact with another hub that belongs to the target cluster. At step 460, the server may determine a routing strategy (e.g., using greedy routing or any other suitable routing algorithms) for routing the content from the one or more source content hubs to the target cluster. At step 470, the server may push the content along with information or instructions relating to the routing strategy to the source content hubs. Based on the information or instructions provided by the server, the source content hubs may route the content through any number of intermediate content hubs to the target cluster. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for distributing content to clusters of user devices including the particular steps of the method of FIG. 4, this disclosure contemplates any suitable method for distributing content to clusters of user devices including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
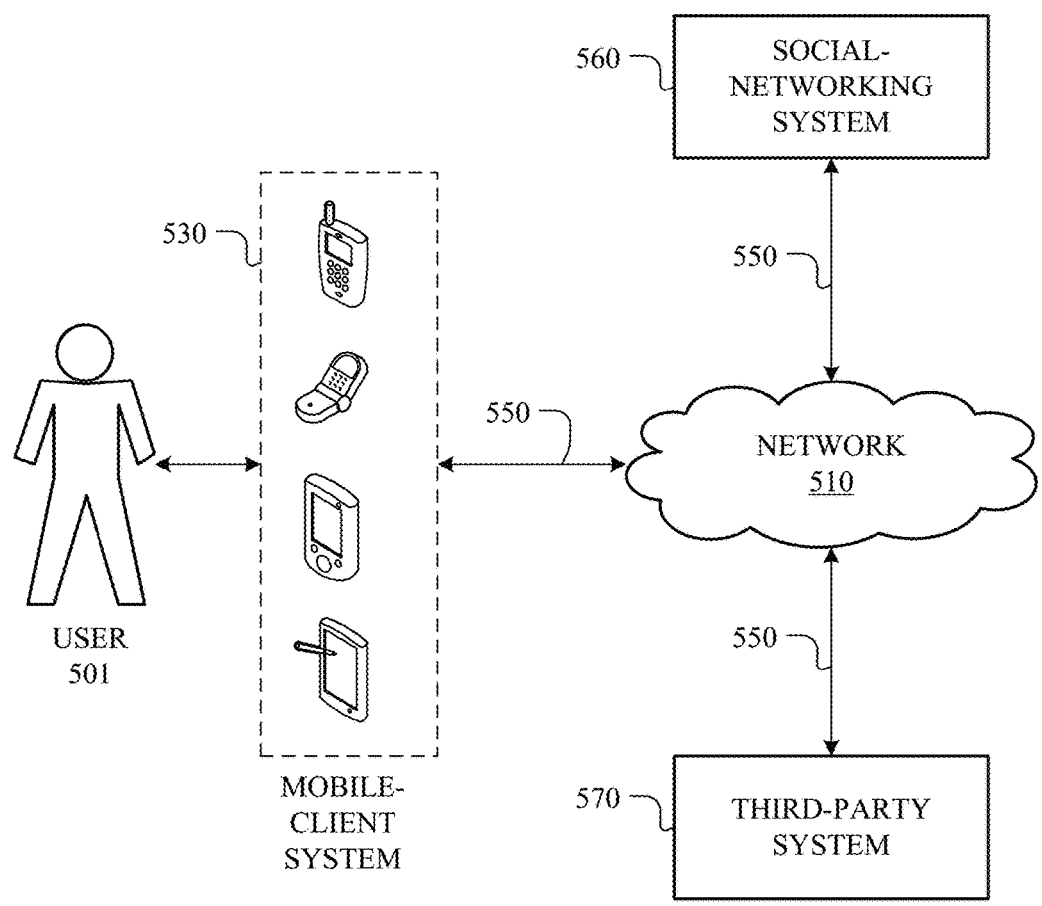
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG.

5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 570 may be a network-addressable computing system that can host content. Third-party system 570 may generate, store, receive, and send content, such as, for example, news articles. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
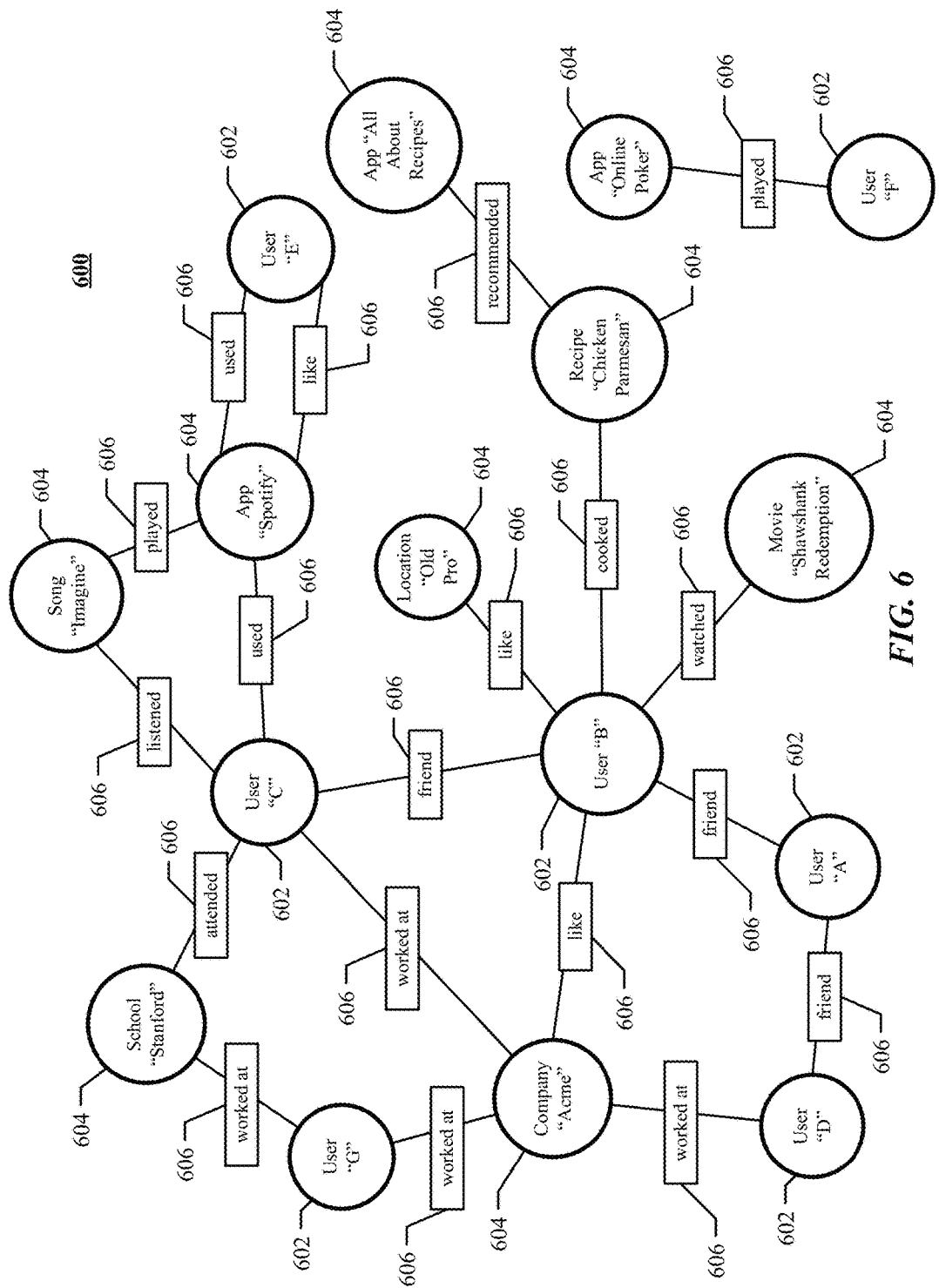
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 130, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 130) may indicate that he or she likes the concept represented by the concept node 604 by clicking or selecting a "Like" icon, which may cause the user's client system 130 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 560 or shared with other systems (e.g., third-party system 570). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 562 may be authorization/privacy servers for enforcing privacy settings. In response to a request from a user (or other entity) for a particular object stored in a data store 564, social-networking system 560 may send a request to the data store 564 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 564, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
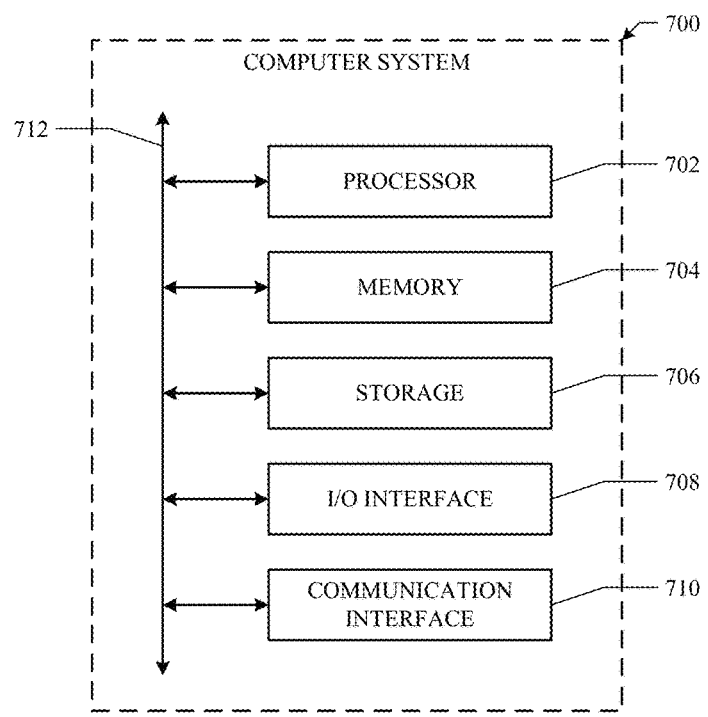
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a first computing device, receiving content;
by the first computing device, determining a content categorization of the received content;
by the first computing device, detecting a second computing device within a peer-to-peer network;
by the first computing device, communicating with the second computing device through a first short-range wireless connection;
by the first computing device, receiving, from the second computing device and through the first short-range wireless connection, information associated with a user of the second computing device;
by the first computing device, calculating, based on the information associated with the user and the content categorization of the content, a confidence score representing a first likelihood of the user of the second computing device that is located within range of the first short-range wireless connection from the first computing device being interested in receiving the content offline from the first computing device through the first short-range wireless connection; and by the first computing device, pushing the content offline from the first computing device to the second computing device within the peer-to-peer network through the first short-range wireless connection based on the confidence score being above a certain threshold.

2. The method of claim 1, wherein the content is received by the first computing device from a third computing device through a second short-range wireless connection between the first computing device and the third computing device.

3. The method of claim 1, further comprising:
by the first computing device, determining that the content is publically available;
wherein the pushing of the content to the second computing device is based on the determination that the content is publically available.

4. The method of claim 1, wherein the information associated with the user of the second computing device is an interest profile of the user.

5. The method of claim 1, further comprising:
by the first computing device, pushing the content to a third computing device through a second short-range wireless connection between the first computing device and the third computing device;
wherein the pushing of the content to the second computing device and the pushing of the content to the third computing device occur substantially simultaneously.

6. The method of claim 1, further comprising:
by the first computing device, determining, for a plurality of content, corresponding content categorizations;
by the first computing device, determining, for the plurality of content, corresponding confidence scores representing likelihoods of the user of the second computing device being interested in the plurality of content based on the information associated with the user and the content categorizations; and
by the first computing device, pushing a subset of the plurality of content offline from the first computing device to the second computing device within the peer-to-peer network based on the confidence scores associated with the subset of the plurality of content being above the certain threshold.

7. The method of claim 1, further comprising:
by the first computing device, sending the first likelihood of the user being interested in the content to the second computing device; and
by the first computing device, receiving from the second computing device an indication of acceptance of the content;
wherein the pushing of the content from the first computing device to the second computing device is in response to the indication of acceptance.

8. The method of claim 7,
wherein the first likelihood of the user being interested in the content is used by the second computing device to compare with other likelihoods of the user being interested in other contents that are stored on other computing devices; and
wherein the other likelihoods are sent from the other computing devices to the second computing device.

9. The method of claim 1, further comprising:
by the first computing device, estimating an amount of time needed for transmitting the content from the first computing device to the second computing device; and by the first computing device, determining that the first short-range wireless connection with the second computing device is stable based on the estimated amount of time needed.

10. The method of claim 9, wherein the estimating of the amount of time needed is based on a distance between the first computing device and the second computing device.

11. The method of claim 9, wherein the determining that the short-range wireless connection is stable is based on relative movement information between the first computing device and the second computing device.

12. The method of claim 1, further comprising:
by the first computing device, receiving cluster information from the second computing device, the cluster information being associated with a cluster of devices to which the second computing device belongs;
by the first computing device, determining a second likelihood of users associated with the cluster of devices being interested in the content based on the cluster information and the content categorization of the content;
wherein the pushing of the content to the second computing device is further based on the second likelihood.

13. The method of claim 12, wherein the cluster information comprises an interest profile of the users associated with the cluster of devices.

14. The method of claim 12, wherein the cluster is defined based on geographic locations of the cluster of devices at a predetermined time period.

15. The method of claim 12, wherein at least one of the devices in the cluster of devices is not within direct wireless communication range with the first computing device when the first computing device is communicating with the second computing device through the first short-range wireless connection.

16. The method of claim 1, wherein the content is received from a server, the method further comprising:
by the first computing device, receiving from the server routing instructions for the content; and
by the first computing device, pushing the routing instructions to the second computing device;
wherein the pushing of the content to the second computing device is further based on the routing instructions.

17. The method of claim 16,
wherein the routing instructions comprise a routing destination, the routing destination being one or more devices associated with a cluster of devices;
wherein the routing destination is determined by the server based on an interest profile of the cluster of devices and the content.

18. The method of claim 16,
wherein the routing instructions comprise a direction from the first computing device to a routing destination, the routing destination being a geographic location associated with a cluster of devices;
wherein the routing destination is determined by the server based on an interest profile of the cluster of devices and the content.

19. One or more computer-readable non-transitory storage media of a first computing device embodying software that is operable when executed to:
receive content;
determine a content categorization of the received content;
detect a second computing device within a peer-to-peer network;

communicate with the second computing device through a first short-range wireless connection;

receive, from the second computing device through the first short-range wireless connection, information associated with a user of the second computing device;

calculate, based on the information associated with the user and the content categorization of the content, a confidence score representing a first likelihood of the user of the second computing device that is located within range of the first short-range wireless connection from the first computing device being interested in receiving the content offline from the first computing device through the first short-range wireless connection; and push the content offline from the first computing device to the second computing device within the peer-to-peer network through the first short-range wireless connection based on the confidence score being above a certain threshold.

20. A first computing device, comprising:

one or more processors; and a memory coupled to the processors comprising instructions executable by the processors, the processors being operable when executing the instructions to:

receive content;

determine a content categorization of the received content;

detect a second computing device within a peer-to-peer network;

communicate with the second computing device through a first short-range wireless connection;

receive, from the second computing device through the first short-range wireless connection, information associated with a user of the second computing device;

calculate, based on the information associated with the user and the content categorization of the content, a confidence score representing a first likelihood of the user of the second computing device that is located within range of the first short-range wireless connection from the first computing device being interested in receiving the content offline from the first computing device through the first short-range wireless connection; and push the content offline from the first computing device to the second computing device within the peer-to-peer network through the first short-range wireless connection based on the confidence score being above a certain threshold.

* * * * *